(12) United States Patent
Dcunha

(10) Patent No.: US 10,603,751 B2
(45) Date of Patent: Mar. 31, 2020

(54) DUST SUPPRESSION ASSEMBLY

(71) Applicant: Aubrey S. Dcunha, Mumbai, Maharashtra (IN)

(72) Inventor: Aubrey S. Dcunha, Maharashtra (IN)

(73) Assignee: Aubrey S. Dcunha, Mumbai (IN)

( * ) Notice: Subject to any disclaimer, the term of this patent is extended or adjusted under 35 U.S.C. 154(b) by 237 days.

(21) Appl. No.: 15/832,054

(22) Filed: Dec. 5, 2017

(65) Prior Publication Data

US 2018/0326549 A1    Nov. 15, 2018

(30) Foreign Application Priority Data

May 9, 2017    (IN) .............................. 201721031417

(51) Int. Cl.
| | | |
|---|---|---|
| *B23Q 11/00* | (2006.01) | |
| *E21B 21/015* | (2006.01) | |
| *B28D 7/02* | (2006.01) | |
| *B25D 17/22* | (2006.01) | |

(52) U.S. Cl.
CPC ...... *B23Q 11/0046* (2013.01); *B23Q 11/0071* (2013.01); *B25D 17/22* (2013.01); *B28D 7/02* (2013.01); *E21B 21/015* (2013.01); *B23Q 11/0078* (2013.01)

(58) Field of Classification Search
CPC ..... E21B 21/01; B05B 15/654; B05B 15/652; Y10S 173/03; Y10S 239/08; Y10T 408/46; B23Q 11/0046; B23Q 11/0011; B25D 17/22; B28D 7/02; E21D 21/015

USPC .............. 173/199, 171, 32; 408/61; 239/600
See application file for complete search history.

(56) References Cited

U.S. PATENT DOCUMENTS

| | | | | | |
|---|---|---|---|---|---|
| 3,547,350 | A | * | 12/1970 | Marcoux ............ | B23Q 11/1084 239/308 |
| 4,986,371 | A | * | 1/1991 | Lowe ..................... | B23Q 11/08 173/171 |
| 5,944,263 | A | * | 8/1999 | Lucco ..................... | E21B 21/01 239/587.1 |
| 6,830,113 | B2 | * | 12/2004 | Moore ............... | B23Q 11/0046 173/171 |
| 7,740,086 | B2 | * | 6/2010 | Bleicher ............... | B25D 17/20 173/198 |

* cited by examiner

*Primary Examiner* — Nathaniel C Chukwurah
(74) *Attorney, Agent, or Firm* — TraskBritt

(57) ABSTRACT

A dust suppression assembly is to be fixed on a handheld device. The dust suppression assembly comprises a device interface member having a top end and a bottom end and an intermediate member having a first intermediate end and a second intermediate end, the first intermediate end adapted to be coupled with the bottom end of the device interface member. Further, the device interface member is having a first channel and the intermediate member is having a second channel, the first channel and second channel joins to form a passage for supplying water to the working end of the tool for suppression of dust, while the handheld device is in use.

20 Claims, 8 Drawing Sheets

DUST SUPPRESSION ASSEMBLY

CROSS-REFERENCE TO RELATED APPLICATION

This application claims the benefit of the filing date of Indian Patent Application Serial No. 201721031417, filed May 9, 2017, for "A Dust Suppression Assembly."

TECHNICAL FIELD

Embodiments of the present invention relate to safety attachment means used in a handheld device for dust related problems and more particularly to a dust suppression assembly for the handheld devices such as rock drills and concrete hammers.

BACKGROUND

While working on handheld devices such as rock drill, jack hammer, chipping hammer and similar demolition handheld devices, a lot of dust is created around the tool and the device. The construction workers are generally exposed to hazardous dust generated during work on rock and concrete, by using aforesaid handheld devices. Further, breathing in the dust can lead to serious health related problems that include silicosis, lung cancer, kidney disease, reduced lung function, and other disorders.

Also, both in developed and in developing countries, overexposure to dust causes several diseases leading to temporary and permanent disabilities and even death in some cases.

As a matter of social justice, human suffering related to work is unacceptable. Moreover, appreciable financial losses result from the burden of occupational and work related diseases on national health and social security systems, as well as horn their negative influence on production and quality of products. All the above mentioned adverse consequences are costly to employers and to society and can be prevented through implementation of prerequisite safety measures.

Some existing technologies for reducing dust include a vacuum suction unit used as an extra attachment with the handheld device. The operator has to already work with heavy machines and with the presence of an extra vacuum unit increases burden on the operator and reduces his productivity. Moreover, the existing technologies are very difficult to manage as the operator has to dismantle the device and/or attachment for changing the tool, i.e., steel of drill rod fitted in the handheld device. Further, another problem that persists with the existing technologies is that the dust is not optimally supressed by the dust supressing means attached to the handheld device because the dust suppression means are not optimally positioned with respect to the work surface. Thus, it leads to dispersion of dust around the handheld device and the worker using the same.

Accordingly, there remains a need in the prior art to have an improved dust suppression means that overcome the aforesaid problems and shortcomings.

BRIEF SUMMARY

Embodiments of the present invention aim to provide a dust suppression assembly for a handheld device such as rock drill, hammer, rammer and similar handheld devices producing dust while its operation and making a challenging environment for the operator working with the device. The present invention provides a mist spray and/or a vacuum suction at an optimal required distance from the tip of a tool or the work surface that allows maximum suppression of dust generated around the tool, while the handheld device is in operation. Also, the dust suppression assembly is to be affixed on to the handheld device that allows easy assembly and disassembly of the tool such as, but not limited to, chisel, drill and rammer tool without dismantling the dust suppression assembly and the handheld device.

According to an aspect of the invention, a dust suppression assembly is disclosed. A dust suppression assembly is to be fixed on a handheld device. The handheld device comprises a handle and a body, the body having a first end and a second end, the first end being fixed to the handle and the second end including a retainer adapted to hold a tool of a predefined length fixed in a hollow cavity of the second end of the body, the tool having a shank end and a working end. The dust suppression assembly comprises a device interface member having a top end and a bottom end, the device interface member is adapted to be affixed onto the second end of the body of the handheld device by and an intermediate member having a first intermediate end and a second intermediate end, the first intermediate end is adapted to be coupled with the bottom end of the device interface member. Further, the device interface member is configured to rest on the retainer. Also, the device interface member is having a first channel and the intermediate member is having a second channel, the first channel and second channel join to form a passage for supplying water to the working end of the tool for suppression of dust, while the handheld device is in use.

In accordance with an embodiment of the invention, the device interface member is a flexible elastic member.

In accordance with an embodiment of the invention, the device interface member is configured to elastically grip contour of the second end of the body of the handheld device.

In accordance with an embodiment of the invention, the device interface member is adapted to incorporate an access means to access the retainer of the handheld device.

In accordance with an embodiment of the invention, the access means is adapted to facilitate the operation of the retainer and tool changing without dismantling the dust suppression assembly and the handheld device.

In accordance with an embodiment of the invention, the bottom end of the device interface member is having internal grooves to couple the intermediate member having external grooves on the first intermediate end.

In accordance with an embodiment of the invention, the bottom end of the device interface member is having internal threads to couple the intermediate member having external threads on the first intermediate end.

In accordance with an embodiment of the invention, the passage includes a spray nozzle at the second intermediate end of the intermediate member adapted to convert water being supplied, into a mist spray.

In accordance with an embodiment of the invention, one or more intermediate members are attached consecutively such that the spray nozzle is within a predetermined range of distance from the working end of the tool.

In accordance with an embodiment of the invention, the first channel of the device interface member further comprises a hose connector in order to connect a water supply hose to the hose connector.

In accordance with an embodiment of the invention, a channel connector is provided between the first channel and the second channel in order to provide a leak proof transportation of water in the passage.

In accordance with an embodiment of the invention, the intermediate member includes a vacuum suction outlet.

In accordance with an embodiment of the invention, the dust suppression assembly further comprises a vacuum cup having a top cup end and a bottom cup end, the top cup end being coupled with the second intermediate end of the intermediate member.

In accordance with an embodiment of the invention, the top cup end is having external grooves in order to couple with the intermediate member having the internal grooves on the second intermediate end.

In accordance with an embodiment of the invention, the top cup end is having external threads in order to couple with the intermediate member having the internal threads on the second intermediate end.

In accordance with an embodiment of the invention, the bottom cup end is having, a larger diameter with respect to the top cup end in order to collect the dust generated around the working end of the tool, while the handheld device is in use.

In accordance with an embodiment of the invention, one or more intermediate members arc attached between the device interface member and the vacuum cup, such that the vacuum cup is within a predetermined range of distance from the working end of the tool.

In accordance with an embodiment of the invention, a hose of a vacuum suction device is attached to the vacuum suction outlet in order to create a negative pressure around the working end of the tool for suppression of dust at the working end of the tool.

In accordance with an embodiment of the invention, the intermediate member includes a seal adapted to prevent entry of the dust into the handheld device, while the handheld device is in use.

In accordance with an embodiment of the invention, the shape of the seal is one of, but not limited to, hexagonal, round and square.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings.

It is to be noted, however, that the appended drawing illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein:

FIG. 1 illustrates a perspective view of an exemplary handheld device;

FIG. 2 illustrates an implementation of dust suppression assembly on the :handheld device, in accordance with an embodiment of the invention;

FIG. 3 illustrates a device interface member, in accordance with an embodiment of the invention;

FIG. 4 illustrates an implementation of dust suppression assembly on the handheld device, in accordance with another embodiment of the invention;

FIG. 5 illustrates an exemplary implementation of dust suppression assembly on a rock drill, in accordance with an embodiment of the invention;

FIG. 6 illustrates another exemplary implementation of dust suppression assembly on a chipping hammer, in accordance with an embodiment of the invention;

FIG. 7 illustrates yet another exemplary implementation of dust suppression assembly on a rivet buster, in accordance with an embodiment of the invention; and FIG. 8 illustrates yet another exemplary implementation of dust suppression assembly on a paving breaker, in accordance with an embodiment of the invention.

DETAILED DESCRIPTION

Figure 1:
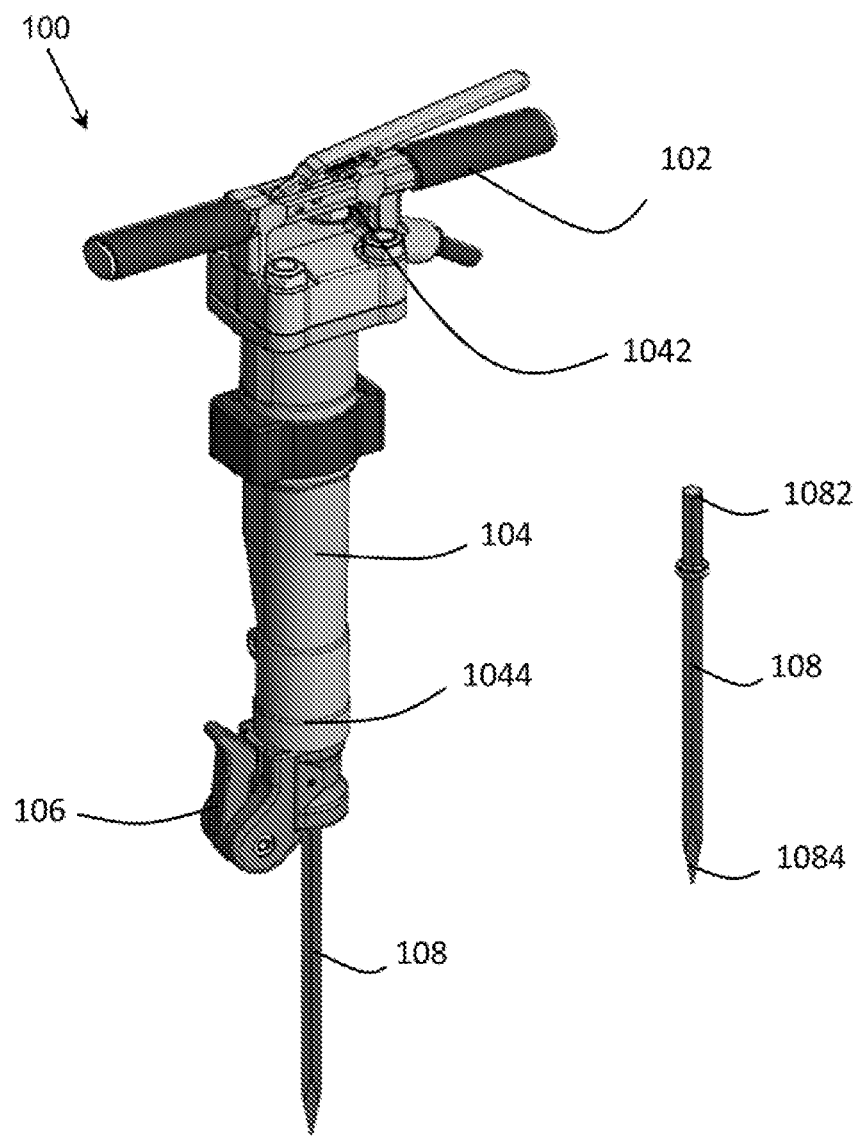

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e., meaning having the potential to), rather than the mandatory sense, (i.e., meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising," it is understood that we also contemplate the same composition, element or group of elements with transitional phrases "consisting of" "consisting," "selected from the group of consisting of," "including," or "is" preceding the recitation of the composition, element or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings, the invention will now be described in more detail. FIG. 1 illustrates an exemplary handheld device (100). The handheld device (100) is one of, but not limited to rock drill, jack hammer, chipping hammer, rivet buster, paving breaker and such similar devices that produces dust. While its operation. The exemplary handheld device (100) includes a handle (102) and a body (104). The body (104) is having a first end (1042) and a second end (1044). The first end (1042) is rigidly fixed with the handle (102). The handheld device (100) is carried by the operator by holding the handheld device (100) from the handle (102). Further, the second end (1044) of the body (104) is provided with a retainer (106). The retainer (106) is one of, but not limited to, latch retainer and ball type retainer. It will be appreciated by a person skilled in the art that different type of retainer (106) may be used for retaining the tool (108) with the handheld device (100) depending upon the type of handheld device (100).

Further, the retainer (106) is adapted to clasp a tool (108) of a predefined length fixed in a hollow cavity of the second end (1044) of the body (104). The tool (108) is one of, but not limited to, chisel, drill, rammer and hammer. Further, the tool (108) is having a shank end (1082) and a working end (1084). The shank end (1082) of the tool (108) is strongly gripped by the retainer (106) such that tool (108) does not come out from the handheld device (100), while its operation. The working end (1084) of the tool (108) is in contact with the work surface such as, but not limited to rock, concrete, tiles, floor etc., on which the handheld device (100) is being, used. Therefore, the dust is generated around the working end (1084) of the tool (108), while the handheld device (100) is in operation. To capture and/or supress the dust generated around the handheld device (100), a dust suppression assembly (200) is used.

Figure 2:
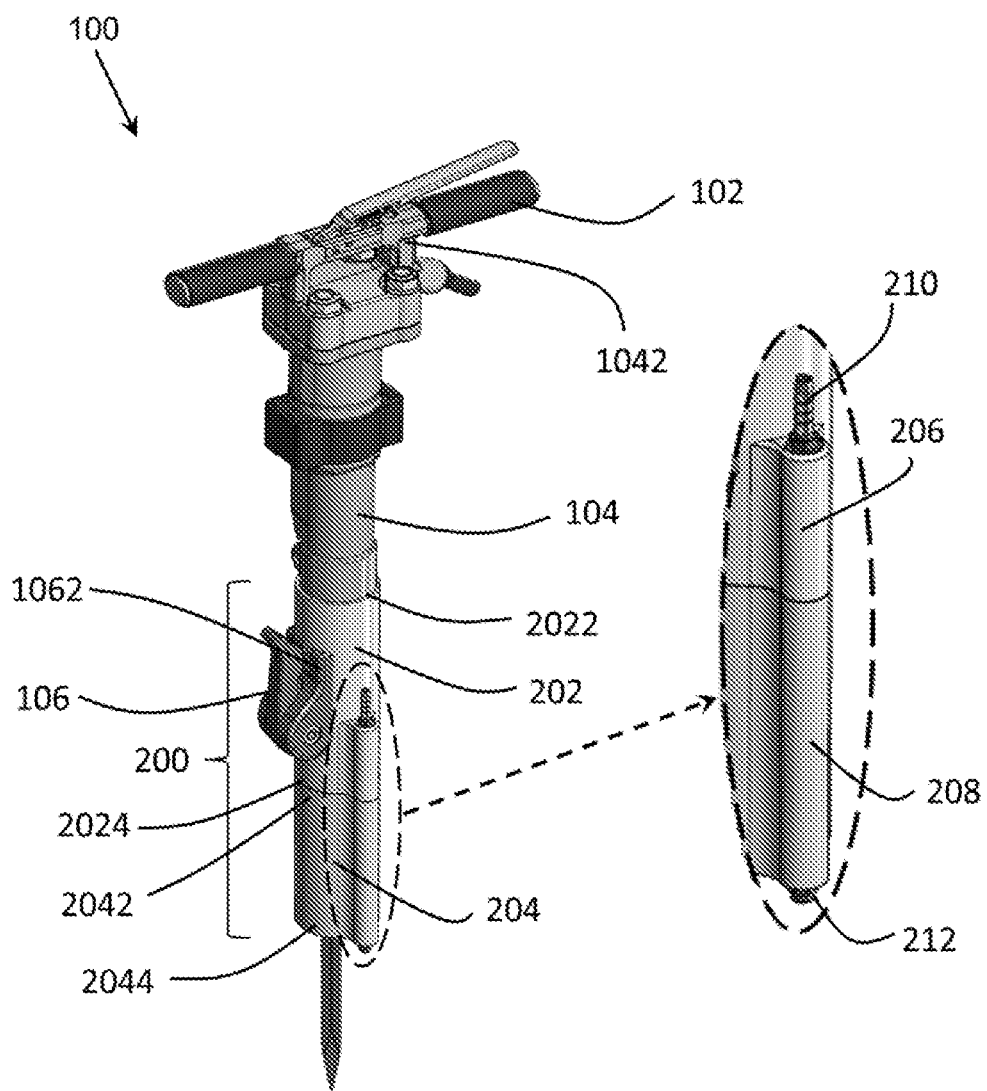

FIG. 2 illustrates an implementation of the dust suppression assembly (200) on the handheld device (100), in accordance with an embodiment of the invention. As shown in FIG. 2, the dust suppression assembly (200) is fixed on to the handheld device (100). The dust suppression assembly (200) comprises a device interface member (202) and an intermediate member (204). The device interface member (202) is a flexible elastic member having a tubular structure. Further, the device interface member (202) is affixed onto the second end (1044) of the body (104) of the handheld device (100). Also, the device interface member (202) is configured to elastically grip the contour of the second end (1044) of the body (104) of the handheld device (100). The elasticity and flexibility of the device interface member (202) allows the device interface member (202) to rest on to the second end (1044) of the body (104) and take the shape of second end (1044) of the body (104).

Additionally, the device interface member (202) is configured to rest on the retainer (106). The device interface member (202) rests on the retainer (106) due to elasticity of the device interface member (202). In one embodiment of the invention, the device interface member (202) is configured to rest on a on a bulged out section (1062) of the retainer (106). Further, it may be appreciated by the person skilled the art that the other types of retainer 106 may be used that does not incorporate the bulged out section (1062).

Figure 3:
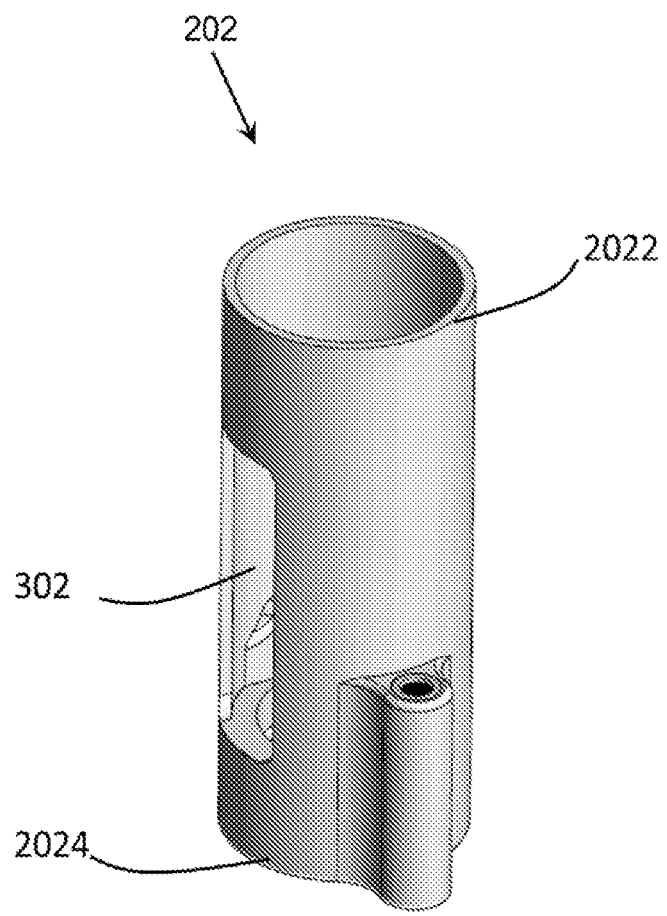

FIG. 3 illustrates the device interface member (202), in accordance with another embodiment of the invention. As shown in FIG. 3, the device interface member (202) is provided with an access means to access the retainer (106) of the handheld device (100). In one embodiment of the invention, the access means is a window (302). The window (302) is a cut out section provided on the device interface member (202). Moreover, the window (302) facilitates the access for operating the retainer (106). Also, the operation of retainer (106) through the window (302) allows changing the tool (108) of the handheld device (100) without dismantling the dust suppression assembly (200) and the handheld device (100). The provision of window (302) provides an advantage to the handheld device (100) operator for changing the tool (108) by easily operating the retainer (106) through the window (302). It will be appreciated by the person skilled in the art that other access means may be provided depending upon the type and size of the retainer (106). The window (302) is just an exemplary representation of the accessing the retainer (106).

Further, the device interface member (202) is having a top end (2022) and a bottom end (2024). Returning to FIG. 2, the intermediate member (204) is having a first intermediate end (2042) and a second intermediate end (2044). The intermediate member (204) is coupled with the device interface member (202). More specifically, the first intermediate end (2042) is coupled with the bottom end (2024) of the device interface member (202). In accordance with one embodiment of the invention, the bottom end (2024) of the device interface member (202) is having internal threads to couple with the intermediate member (204) having external threads on the first intermediate end (2042). In one embodiment of the invention, the bottom end (2024) of the device interface member (202) is having internal grooves to couple with the intermediate member (204) having external grooves on the first intermediate end (2042). Other coupling means such as clamp and/or similar fastening means may also be used, as will be appreciated by the person skilled in the art.

In accordance with an embodiment of the invention, the device interface member (202) is having a first channel (206) and the intermediate member (204) is having a second channel (208). A passage is formed by coupling the device interface member (202) and the intermediate member (204) by the mating of the first channel (206) and the second channel (208). Further, the first channel (206) of the device interface member (202) comprises a hose connector (210) in order to connect a water supply hose (not shown) to the hose connector (210).

Further, a channel connector (not shown) is provided in the passage between the first channel (206) and the second channel (208). The channel connector provides a leak proof transportation of water in the passage. In accordance with an embodiment of the invention, the spray nozzle (212) must be within a predetermined range of distance from the working end (1084) of the tool (108) for optimally suppressing the dust around the tool (108). Thus, one or more intermediate members (204) are attached consecutively to accommodate the length of the tool (108) such that the distance of spray nozzle (212) from the working end (1084) of tool (108) remains consistent.

Figure 4:
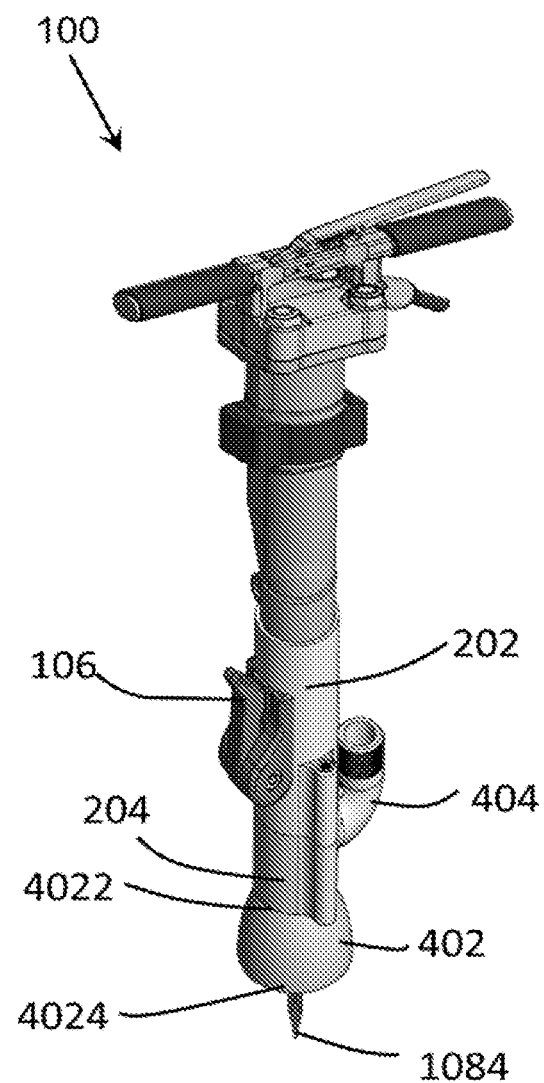

FIG. 4 illustrates an implementation of dust suppression assembly (200) on the handheld device (100), in accordance with another embodiment of the invention. As shown in FIG. 4, the dust suppression assembly (200) further comprises a vacuum cup (402) coupled with the intermediate member (204). Further, the vacuum cup (402) includes a top cup end (4022) and a bottom cup end (4024), the top cup end (4022) is coupled with the second intermediate end (2044) of the intermediate member (204). In accordance with an embodiment of the invention, the top cup end (4022) is having external threads in order to couple with the intermediate member (204) having the internal threads on the second intermediate end (2044). In one embodiment of the invention, the top cup end (4022) is having external grooves in order to couple with the intermediate member (204) having the internal grooves on the second intermediate end (2044). It will be appreciated that other coupling means such as clamp and/or similar fastening means may also be used by the person skilled in the art.

In accordance with another embodiment of the invention, the intermediate member (204) includes a vacuum suction outlet (404). A hose of a vacuum suction device (not shown) is attached to the vacuum suction outlet (404) in order to create a negative pressure around the working end (1084) of the tool (108). Further, the bottom cup end (4024) is having a larger diameter with respect to the top cup end (4022). The larger diameter of bottom cup end (4024) allows collecting maximum dust generated around the working end (1084) of the tool (108), while the handheld device (100) is in use for suppression of dust at the working end (1084) of the tool (108).

Further, the vacuum cup (402) must be near to the working end (1084) of the tool (108) for suppressing maximum dust generated by the tool (108). Therefore, one or more intermediate members (204) are attached between the device interface member (202) and the vacuum cup (402), such that the vacuum cup (402) is within a predetermined range of distance from the working end (1084) of the tool (108). The distance between the vacuum cup (402) and tool (108) is kept optimal such that maximum dust is collected by the vacuum suction device through vacuum cup (402) in order to suppress the dust generated around the tool (108), while the handheld device (100) is in use.

Further, the intermediate member (204) includes a seal adapted to prevent entry of the dust into the handheld device (100), while the handheld device (100) is in use. The seal is an elastic member provided inside a hollow cavity of the intermediate member (204) such that the tool (108) passes through the seal and blocks the passage of the dust to enter the internal moving components of the handheld device (100). In accordance with an embodiment of the invention, the shape of the seal is similar to cross section of the tool (108). For instance: If the shape of the cross section of the tool (108) is hexagonal and tool (108) is only reciprocating in up and down direction only, then the shape of the seal is also hexagonal. In one embodiment the shape of the seal is selected from, but not limited to, hexagonal, square and round. Further, in another instance, if the cross section of the tool (108) is hexagonal, and the tool (108) tends to rotate around its horizontal axis and making a round profile while rotation, thus a round shape of the seal is required. Thus, depending upon the cross section of the tool (108) and motion of the tool (108) while in operation, a particular shape of the seal is selected.

Figure 5:
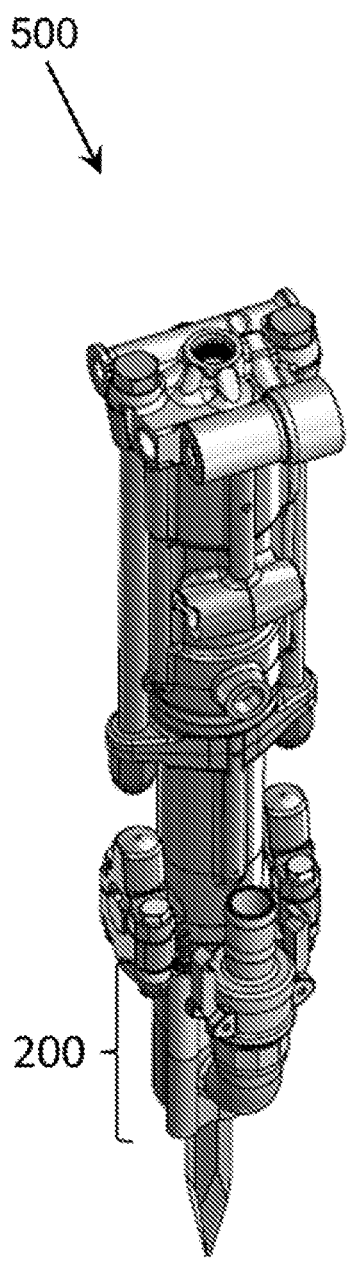

FIG. 5 illustrates an exemplary implementation of dust suppression assembly (200) on rock drill (500), in accordance with an embodiment of the invention.

Figure 6:
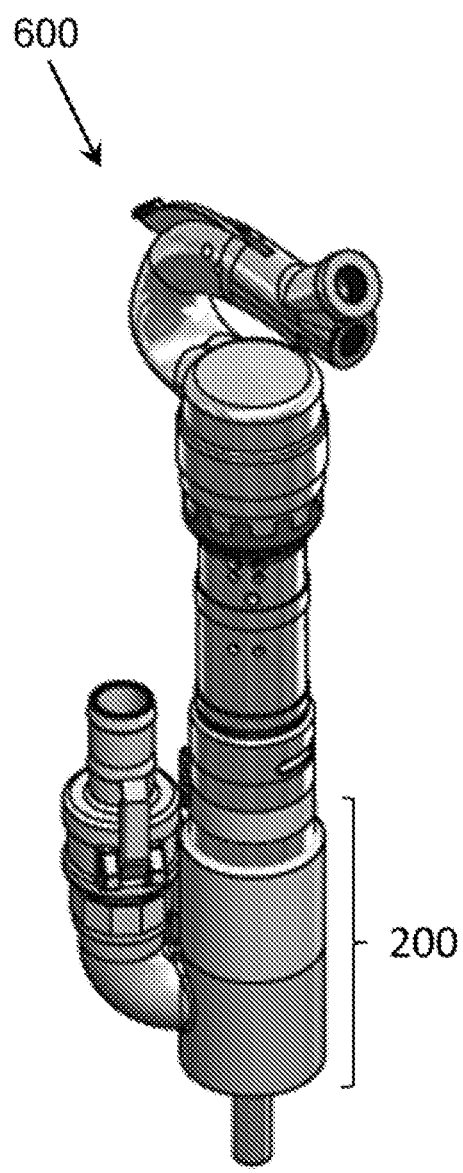

FIG. 6 illustrates an exemplary implementation of dust suppression assembly (200) on chipping, hammer (600), in accordance with an embodiment of the invention.

Figure 7:
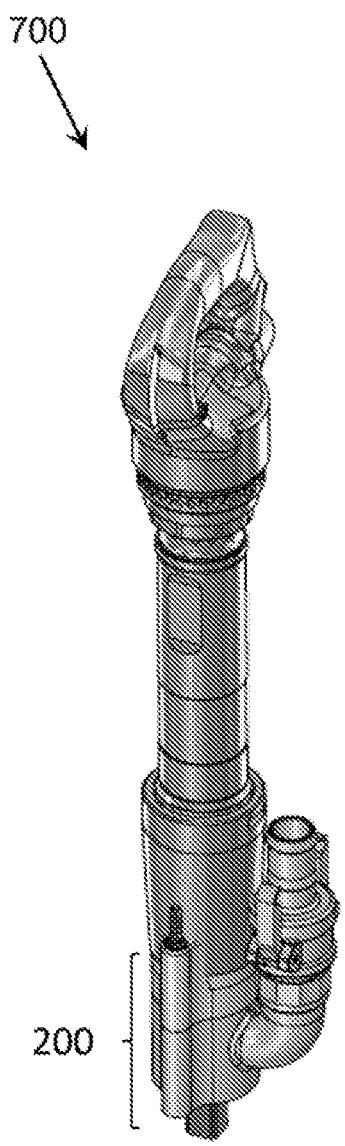

FIG. 7 illustrates an exemplary implementation of dust suppression assembly (200) on a rivet buster (700), in accordance with an embodiment of the invention.

Figure 8:
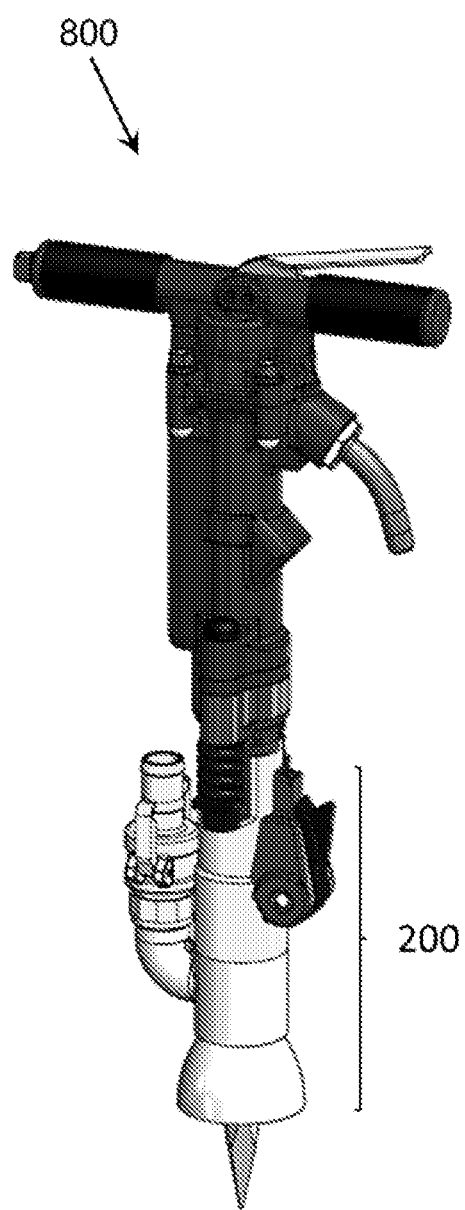

FIG. 8 illustrates an exemplary implementation of dust suppression assembly (200) on a paving breaker (800), in accordance with an embodiment of the invention.

The dust suppression assembly (200) described above offer a number of advantages. First, the dust suppression assembly (200) comprises both means of suppressing dust that includes water mist and by creating negative pressure (vacuum) around the tool (108). Further, depending upon the requirement, type of work, environment and available resource (water or vacuum) may be used with the handheld device (100). Also, the access means is provided on the device interface member (202) that allows operation of the retainer (106) that facilitates in attaching and/or detaching of the tool (108) without dismantling the dust suppression assembly (200) and the handheld device (100). Another, advantage is that an optimal distance is provided between the working end (1084) of tool (108) and dust suppression means that are mist spray nozzle (212) and vacuum cup (402), as the case may be according to the requirement.

Moreover, both the dust suppression assemblies (200) can be used simultaneously in a handheld device (100). Further, at the time of using mist spray for suppressing the dust the vacuum cup (402) must be dis-assembled from the dust suppression assembly (200). Similarly, the vacuum cup (402) must be assembled for working with vacuum for suppression of dust around the handheld device (100).

Additionally, one or more intermediate members (204) may be used for accommodating the length of the tool (108). That is, the second end of the intermediate member (204) need to be at an optimal distance from working end (1084) of the tool (108) such that maximum dust suppression can be done. Further, depending, upon the length of tool (108) one or more intermediate member (204) may be used.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

What is claimed is:

1. A dust suppression assembly to be fixed on a handheld device comprising a handle and a body, the body having a first end and a second end, the first end being fixed to the handle and the second end including a retainer adapted to hold a tool of a predefined length fixed in a hollow cavity of the second end of the body, the tool having a shank end and a working end, the dust suppression assembly comprising:
    a device interface member having a top end and a bottom end, the device interface member adapted to be affixed onto the second end of the body of the handheld device; and
    an intermediate member having a first intermediate end and a second intermediate end, the first intermediate end adapted to be coupled with the bottom end of the device interface member;
    wherein the device interface member is configured to rest on the retainer; and wherein the device interface member is having a first channel and the intermediate member is having a second channel, the first channel and second channel joins to form a passage for supplying water to the working end of the tool for suppression of dust, while the handheld device is in use.

2. The dust suppression assembly as claimed in claim 1, wherein the device interface member is a flexible elastic member.

3. The dust suppression assembly as claimed in claim 2, wherein the device interface member is configured to elastically grip a contour of the second end of the body of the handheld device.

4. The dust suppression assembly as claimed in claim 1, wherein the device interface member is adapted to incorporate an access means to access the retainer of the handheld device.

5. The dust suppression assembly as claimed in claim 4, wherein the access means is adapted to facilitate operation of the retainer and tool changing without dismantling the dust suppression assembly and the handheld device.

6. The dust suppression assembly as claimed in claim 1, wherein the bottom end of the device interface member is having internal grooves to couple the intermediate member having external grooves on the first intermediate end.

7. The dust suppression assembly as claimed in claim 1, wherein the bottom end of the device interface member is having internal threads to couple the intermediate member having external threads on the first intermediate end.

8. The dust suppression assembly as claimed in claim 1, wherein the passage includes a spray nozzle at the second intermediate end of the intermediate member adapted to convert water being supplied, into a mist spray.

9. The dust suppression assembly as claimed in claim 1, wherein one or more intermediate members are attached consecutively such that a spray nozzle is within a predetermined range of distance from the working end of the tool.

10. The dust suppression assembly as claimed in claim 1, wherein the first channel of the device interface member further comprising a hose connector in order to connect a water supply hose to the hose connector.

11. The dust suppression assembly as claimed in claim 10, wherein a channel connector is provided between the first channel and the second channel in order to provide a leak proof transportation of water in the passage.

12. The dust suppression assembly as claimed in claim 10, wherein a hose of a vacuum suction device is attached to a vacuum suction outlet in order to create a negative pressure around the working end of the tool for suppression of dust at the working end of the tool.

13. The dust suppression assembly as claimed in claim 1, wherein the intermediate member includes a vacuum suction outlet.

14. The dust suppression assembly as claimed in claim 1, further comprising a vacuum cup having a top cup end and a bottom cup end, the top cup end being coupled with the second intermediate end of the intermediate member.

15. The dust suppression assembly as claimed in claim 14, wherein the top cup end is having external grooves in order to couple with the intermediate member having internal grooves on the second intermediate end.

16. The dust suppression assembly as claimed in claim 14, wherein the top cup end is having external threads in order to couple with the intermediate member having internal threads on the second intermediate end.

17. The dust suppression assembly as claimed in claim 14, wherein the bottom cup end is having a larger diameter with respect to the top cup end in order to collect dust generated around the working end of the tool, while the handheld device is in use.

18. The dust suppression assembly as claimed in claim 14, wherein one or more intermediate members are attached between the device interface member and the vacuum cup, such that the vacuum cup is within a predetermined range of distance from the working end of the tool.

19. The dust suppression assembly as claimed in claim 1, wherein the intermediate member includes a seal adapted to prevent entry of dust into the handheld device, while the handheld device is in use.

20. The dust suppression assembly as claimed in claim 19, wherein the shape of the seal is one of hexagonal, round and square.

* * * * *

UNITED STATES PATENT AND TRADEMARK OFFICE
CERTIFICATE OF CORRECTION

PATENT NO. : 10,603,751 B2  
APPLICATION NO. : 15/832054  
DATED : March 31, 2020  
INVENTOR(S) : Aubrey S. Dcunha Page 1 of 1

It is certified that error appears in the above-identified patent and that said Letters Patent is hereby corrected as shown below:

In the Specification

| | | |
|---|---|---|
| Column 1, | Line 37, | change "as horn their" to --as from their-- |
| Column 3, | Line 20, | change "is having, a" to --is having a-- |
| Column 3, | Line 25, | change "members arc attached" to --members are attached-- |
| Column 3, | Line 61, | change "on the :handheld" to --on the handheld-- |
| Column 5, | Line 16, | change "produces dust. While" to --produce dust, while-- |
| Column 5, | Line 40, | change "is being, used." to --is being used.-- |
| Column 5, | Line 67, | delete extra occurrence of "on a" |
| Column 7, | Line 66, | change "on chipping, hammer" to --on chipping hammer-- |
| Column 8, | Line 35, | change "depending, upon the" to --depending upon the-- |

Signed and Sealed this  
Twelfth Day of May, 2020

Andrei Iancu  
*Director of the United States Patent and Trademark Office*